Dec. 28, 1926.
E. C. WEISGERBER
OIL AND WATER SEPARATOR
Filed Sept. 26, 1923
1,612,557
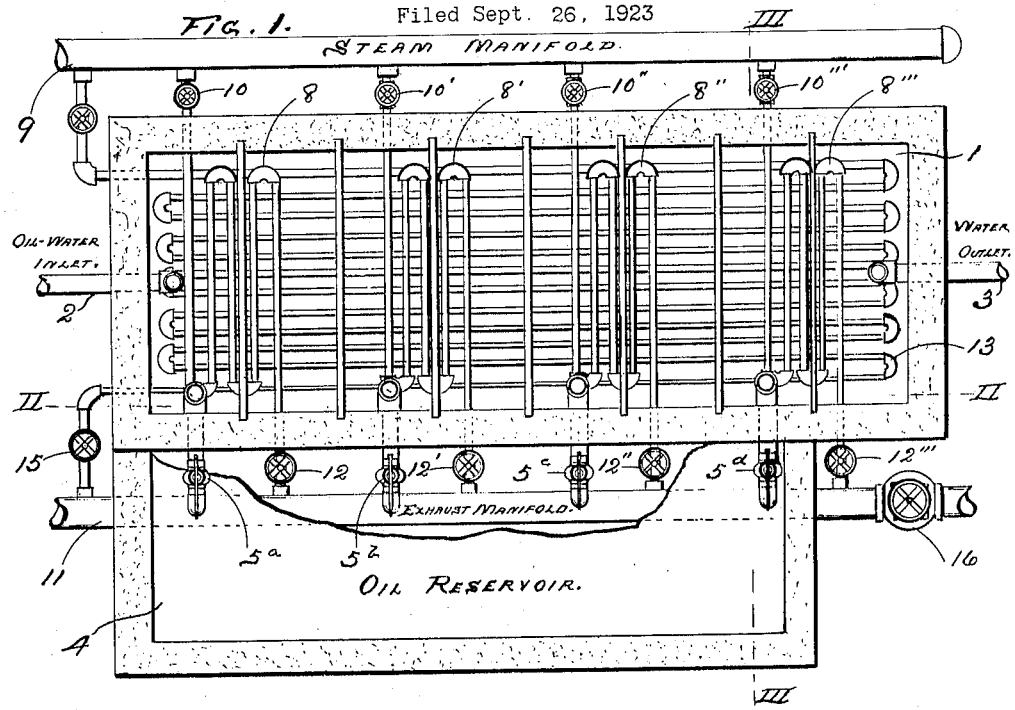
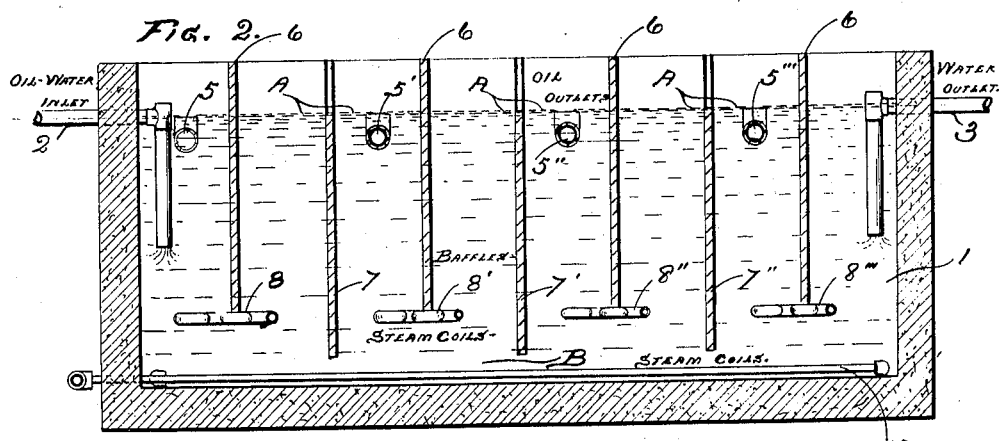
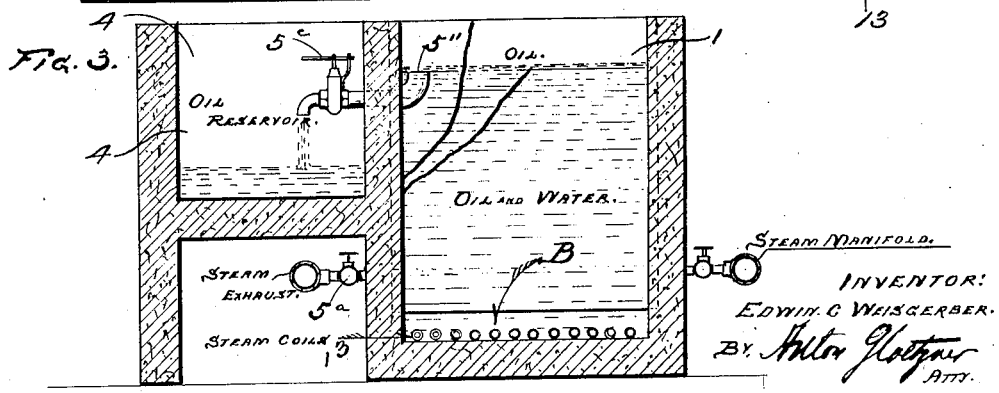

Patented Dec. 28, 1926.

1,612,557

UNITED STATES PATENT OFFICE.

EDWIN C. WEISGERBER, OF LONG BEACH, CALIFORNIA.

OIL AND WATER SEPARATOR.

Application filed September 26, 1923. Serial No. 664,871.

My invention relates to the treatment of oily mixtures and it has especial reference to an apparatus for separating water and oil and recovering the oil, the object of the invention being to provide a simple and efficient device in which a mixture of water and oil may be treated in a continuous manner to bring about a complete separation of the mixed ingredients, whether occurring purely as a mechanical mixture or as an emulsion, and in which practically a full recovery of the oil may be had, at a minimum of expense.

Other objects will appear from the subjoined specification in connection with the accompanying drawing, which is representative of a form of embodiment of the invention and in which—

Fig. 1 is a plan view showing an apparatus of preferred construction and arrangement of parts with heating means and means for dividing the area of the apparatus into zones.

Fig. 2 is a sectional view, taken on line 2—2 Fig. 1, looking in the direction of the arrow, and Fig. 3 is a section taken on line 3—3, Figs. 1 and 2 showing the baffling arrangement and oil reservoir, with means for supplying heat to the container or tank into which the mixture of oil and water is supplied.

My invention consists of means for establishing and causing a current or movement in a body of liquid having separable components, while maintaining substantially quiescent the superficial stratum; simultaneously acting upon the moving body to cause the separable components to levitate and collect on the surface of the mixture, and continuously removing the supernatant liquid.

Specifically referring to the drawing, the invention is shown as consisting of a tank or receptacle 1, of any suitable material, having an inlet pipe 2 for the mixture of water and oil to be treated, and an outlet pipe 3 for the water from which the oil has been separated, during the travel of the mixture from one end of said tank to the other, and collected in a convenient reservoir 4. Suitable outlets 5, 5', 5", and 5''', are provided in the reservoir 1 to drain off the supernatant oil. These outlets 5, 5', 5", and 5''', are arranged at a height substantially parallel with the level of the mixture, so that the floating oil on the surface of the water will escape continuously as it rises. Each of the drain or outlet pipes 5, 5', 5", and 5''', is provided with a manually operable valve, 5ª, 5ᵇ, 5ᶜ, and 5ᵈ, whereby a quick closure of same may be effected when water or a mixture of water and oil begins to escape. A series of baffles 6, are vertically disposed within said tank 1, and extend from the top thereof to a determined distance from the bottom. These baffles 6 alternate with a series of vertically disposed baffles 7, the upper edges of which are on a line parallel with the water surface and the outlets 5, 5', 5", and 5''', and below the upper edges of the baffles 6. The bottom edges of the baffles 7 extend below the lower or bottom edges of the baffles 6, and free of the bottom of the tank 1. Thus the spaces between the vertically disposed baffles 6 provide quiet zones A for collection upon the surfaces thereof, of the oil rising through the water. The space B below the baffles 6 and 7 provides a circulating area for the water or water and oil, and the agitation of the fluid ensuing on circulation produces a liberation or separation of the oil, which rises between the baffles 6 and 7 and accumulates on the surface. At the bottom of each of the baffles 6 is a coil 8, 8', 8", and 8''' for supplying heat to the mixture to effect a readier and more complete separation of the oil from the water and also to break up to the greatest extent an emulsified condition of the oil and water. Each of these coils 8, 8', 8", and 8''' is connected at the end thereof to a heat supplying manifold 9, through which steam, superheated steam, combustion gases or any other heating medium may be caused to flow, a valve 10, 10', 10", and 10''', on each of the coils 8, 8', 8", and 8''' serving to regulate the heat of the coils independently of each other, whereby variations in temperatures may be obtained in the several spaces or zones A where necessary to free the oil from the water during the travel of the mixture around the coils 8, 8', 8", and 8'''. Because of the disposition of the ends of the baffles 7 on a lower plane than the baffles 6, the oil and water mixture must circulate around the heating coils 8, 8', 8", and 8''', which are arranged on a higher parallel plane than the lower edges of said baffles 7 and during such circulation, the water and oil, a mixture or emulsified oil, are acted upon to separate them into their individual constituents of water and oil.

The other end of each of said coils 8, 8', 8'', and 8''', respectively, is connected to an exhaust manifold 11, and is provided with a valve 12, 12', 12'', and 12''' for obvious purposes.

On the bottom of the tank 1, and occupying substantially the entire space B below the baffles 6 and 7 is a heating coil 13, connected at one end with the manifold 9, and at the other end to an exhause manifold 14, valves 15 and 16 respectively being provided for regulative purposes.

This coil 13 provides a steady and constant source of heat which may be required to act upon the oil mixture and operates in conjunction with the coils 8, 8', 8'', 8''' to maintain in the flowing current of oil mixture a temperature sufficient to effect a separation of the oil from the water.

What I claim, is:

A device for separating oil from water comprising a tank having an inlet and an outlet, a series of vertically disposed baffles within and extending from the top of said tank to near the bottom thereof and providing an uninterrupted circulating space along the bottom of said tank, certain of said baffles permitting the water to pass beneath the lower edges of same and the oil to pass over the upper edges of same, drain pipes between said baffles, a heating means parallel with the bottom of said tank, a plurality of coils disposed at the bottom of certain of said baffles, and means to heat all of said coils separately or collectively.

In testimony whereof I have set my hand.

EDWIN C. WEISGERBER.